Sept. 30, 1941. G. E. LEWIS 2,257,566
WELDING ELECTRODE AND METHOD OF FORMING THE SAME
Filed May 29, 1939

INVENTOR.
GEORGE E. LEWIS
BY Whittemore Hulbert & Belknap
ATTORNEYS

Patented Sept. 30, 1941

2,257,566

UNITED STATES PATENT OFFICE 2,257,566

WELDING ELECTRODE AND METHOD OF FORMING THE SAME

George E. Lewis, Detroit, Mich., assignor of one-half to Bert L. Quarnstrom, Detroit, Mich.

Application May 29, 1939, Serial No. 276,431

8 Claims. (Cl. 219—4)

The invention relates to welding electrodes and more particularly to electrodes designed for use in spot welding. It is the object of the invention to obtain an improved method of manufacture which lessens the cost and improves the quality of the product. It is a further object to obtain a construction having an attachable tip which when worn to be no longer serviceable may be readily replaced. It is a further object to obtain a construction in which the tip and shank are concentric with a common axis so as to be always accurately aligned with the cooperating electrode. Other objects of the invention include the forming of an interlocking joint between the tip and shank which will resist tension as well as compressive stresses; the maintaining of a waterproof seal and the obtaining of good electrical conductivity through the joint. With these objects in view, the invention consists in the construction as hereinafter set forth.

Welding electrodes are usually formed with a tip portion for contacting with the work and a tubular shank portion which permits of passing a cooling liquid therethrough. In certain constructions these two parts are formed integral, but after the tip wastes to a point where it is no longer serviceable it is necessary to discard the whole structure. Other constructions have been made with replaceable tips but here difficulty is encountered in the formation of a satisfactory joint which provides strength, accuracy, good electrical conductivity and a liquid-proof seal. With my improved construction these difficulties have been overcome, while at the same time the cost of manufacture has been reduced.

Figure 1:
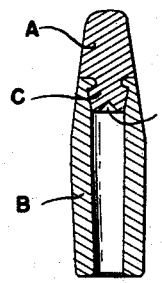
Figures 1 to 6 are central longitudinal sections through my improved electrode as variously modified.
Figure 2:
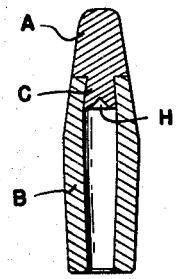
Figure 3:
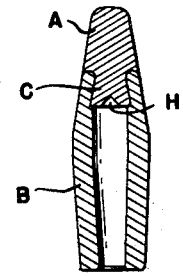
Figure 4:
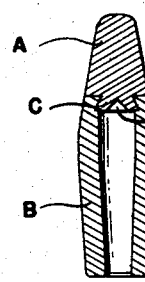
Figure 5:
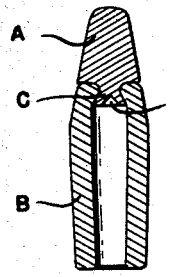
Figure 6:
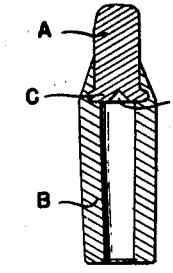
Figure 8:
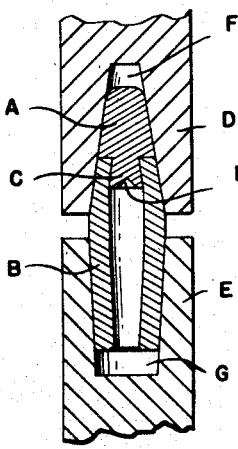
Figure 8 is a longitudinal section illustrating the manner of joining the tip and shank and accurately fashioning the same.
Figure 7:
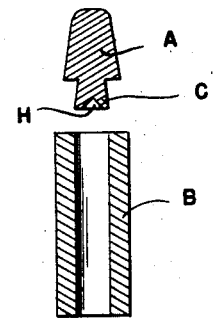
Figure 7 is a section showing the tip and tube for forming the shank prior to attachment.

As illustrated, A is the tip which may be formed of any suitable material having the desired physical characteristics, such for instance as chrome copper, cadmium copper, beryllium copper, nickel cobalt copper or silicon copper, all of which have greater rigidity under heat than pure copper. B is a tubular shank which is secured to the tip A through the medium of an interlocking mechanical joint. Preferably, this joint is formed by providing the tip with an end portion C reduced in diameter and grooved or undercut so as to be of greatest diameter at its rear end. The shank which is formed of a length of tubing is sleeved over this reduced end portion, after which the parts are subjected to mechanical pressure sufficient to conform the one to the other, and to obtain an interlock. The joining of the two parts is best accomplished as illustrated in Figure 8, in which opposed die members D and E are each formed with aligned conical recesses F and G. The tip is then placed with its contracted end portion in engagement with the tube B, after which both parts are placed in the opposed dies and the latter are moved toward each other. The pressure of these dies will contract the upper end of the tube about the reduced end portion C of the tip and will also refashion the lower end portion of the tube to impart thereto a tapering form. The pressure is sufficient to accurately conform the inner surface of the tube to the portion C of the tip and to press these parts together so as to form a liquid-tight seal, and also to secure high electrical conductivity therebetween. The exact form of the tip may be modified in various ways, as for instance as illustrated in Figures 1 to 6 inclusive, but in all modifications the final joint obtained is one which will resist tension stresses, as well as compressive stresses. This is of importance for at times the tip of an electrode may become affixed to the work, so that in retracting the electrode the shank might be detached from the tip. This, however, is prevented with my construction on account of the undercutting of the portion C and the inter-engagement of the tube therewith.

After a tip has been used for a certain length of time it will become so worn as to be no longer serviceable. It is then possible to replace the tip by first placing the shank in a suitable holder, inserting a punch in the tube, and driving the tip out of its interlocking engagement. For this purpose the tip is preferably formed with a central recess H at its inner end for engaging and centering the punch. After the old tip is removed a new tip may be driven into the end of the tube or in case the tube end has been injured a portion thereof may be cut off and the tip driven into the remaining portion. The two members are then again placed in the dies D and E to contract the tube on the tip and to form the interlocking joint.

In the use of electrodes in spot welding machines it has been found that in case one electrode fails to properly align with the cooperating electrode this will cause an uneven heating and wasting of the ends of the electrodes, resulting in still further misalignment. With my improved method the parts being refashioned in dies, will be highly accurate so that exact alignment of the cooperating replacement electrodes is insured.

While as above stated, I preferably form the tips from alloy copper to secure greater rigidity under heat it is not necessary to use this material for the tubular shank. In fact, it is desirable to use copper of higher electrical conductivity than is possible to obtain with these alloys. When such a tubular shank is mechanically joined to the tip the higher conductivity of the metal of the shank will compensate for any slight loss that may occur through the mechanical joint.

What I claim as my invention is:

1. The method of forming welding electrodes comprising the forming of a solid tip with an end portion reduced in diameter and undercut, and contracting a tubular portion of a shank about said end portion thereby applying pressure normal to the contacting surfaces to form an interlocking highly electrically conductive and sealing mechanical joint.

2. The method of forming welding electrodes comprising forming a solid tip with an end portion reduced in diameter and with an undercut annular groove therein, sleeving a tubular portion of a shank about said end portion, placing said parts in opposed conically recessed dies, and moving said dies axially toward each other to contract said shank into conformity to said undercut groove by a pressure normal to the contacting surfaces to form a highly electrically conductive joint and to refashion the opposite end portions of said shank into a tapering form.

3. A welding electrode comprising a solid tip having an undercut end portion reduced in diameter and a shank having a tubular portion contracted about said undercut end portion to form an interlocking and highly electrically conductive mechanical joint therewith.

4. A welding electrode comprising a solid tip having an end portion reduced in diameter and forming an undercut groove and a shank having a tubular portion contracted about said end portion into conformity to said undercut groove forming a mechanically interlocking and highly electrically conductive sealed joint.

5. The method of reconditioning welding electrodes having a solid tip portion with a reduced and undercut end and a tubular shank portion contracted about said reduced end comprising driving a wasted tip out from said tubular shank and thereby expanding the contracted portion thereof, engaging a replacement tip with said expanded tubular shank, and re-contracting said tubular shank about the reduced and undercut end portion of said replacement tip to form a mechanically interlocking and highly electrically conductive sealed joint therebetween.

6. A welding electrode comprising a solid tip fashioned to have a rear end portion projecting radially outward beyond a portion immediately in front thereof and a shank having a tubular portion contracted about said tip to interlock with the radially projecting portion thereof and to form a highly electrically conductive joint therewith.

7. A welding electrode comprising a solid tip formed from a copper alloy having at working temperature an increased rigidity and slightly decreased electrical conductivity in comparison with commercial copper, and a shank formed of commercial copper having a tubular portion contracted about said tip forming an electrically conductive mechanical joint with said tip, its greater electrical conductivity substantially compensating for the added resistance of the joint thereby obtaining nearly as high electrical conductivity in the composite construction as in an integral construction formed of the alloy.

8. The method of forming welding electrodes comprising forming a tip with a portion at the rear end thereof projecting radially outwardly beyond a portion immediately in advance thereof, separately forming a shank having a tubular forward portion engageable with the rear end portion of said tip, and thereafter contracting the tubular portion of said shank about said tip by a pressure normal to the contacting surfaces thereof to form an interlocking highly electrically conductive joint therebetween.

GEORGE E. LEWIS.